(12) United States Patent
Nixon et al.

(10) Patent No.: US 9,499,033 B1
(45) Date of Patent: Nov. 22, 2016

(54) MODULAR TOP FOR A VEHICLE

(71) Applicant: Textron, Inc., Providence, RI (US)

(72) Inventors: Ryan Scott Nixon, North Augusta, SC (US); Aric Lee Singletary, Augusta, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 14/797,799

(22) Filed: Jul. 13, 2015

(51) Int. Cl.
  *B60J 7/10* (2006.01)
  *B60J 7/185* (2006.01)

(52) U.S. Cl.
  CPC .............. *B60J 7/104* (2013.01); *B60J 7/1858* (2013.01)

(58) Field of Classification Search
  CPC .............................. B60J 7/104; B60J 7/1858
  USPC ......................................................... 296/102
  See application file for complete search history.

(56) References Cited

U.S. PATENT DOCUMENTS

| | | | | |
|---|---|---|---|---|
| 6,776,445 B1* | 8/2004 | Conner | ...................... | B60J 7/08 296/148 |
| 6,979,040 B1* | 12/2005 | Brewer, Jr. | .............. | B60J 11/00 296/77.1 |
| 7,029,052 B2* | 4/2006 | Troeger | ................. | B60J 7/1265 296/107.19 |
| 7,118,160 B2* | 10/2006 | Willard | .................. | B60J 7/1265 296/107.01 |
| 8,162,378 B2* | 4/2012 | Kreiling | ................. | B60J 7/1295 296/107.09 |
| 8,297,679 B2* | 10/2012 | Held | ......................... | B60J 5/08 296/141 |
| 9,156,336 B2* | 10/2015 | Fennell | ...................... | B60J 5/08 |
| 2009/0115222 A1* | 5/2009 | Hohnl | ...................... | B60Q 1/30 296/183.1 |
| 2015/0130213 A1* | 5/2015 | Haberkamp | ........... | B60J 7/1858 296/107.11 |

* cited by examiner

*Primary Examiner* — Pinel Romain
(74) *Attorney, Agent, or Firm* — Polster Lieder (57) ABSTRACT

A modular top system for a vehicle is provided. In various embodiments, the system includes a plurality of rail sections, a plurality of corner brackets for connecting the rail sections to form a frame, and a flexible, collapsible cover to be deployed over and connected to the frame. The modular top system can additionally include a plurality of cover connecting devices disposable on a periphery of each of the sides of the cover. Each connecting device is for removably connecting each respective cover side to the frame to deploy the cover over and connect the cover to the frame. Each rail section can comprise at least one assembly connector for connecting any of a plurality of system assembly components to the respective rail section, and/or at least one accessory connector for connecting at least one modular top accessory to the respective rail section.

15 Claims, 6 Drawing Sheets

MODULAR TOP FOR A VEHICLE

FIELD

The present teachings relate to tops for open cabin vehicles, such as golf cars, utility vehicles, personal transportation vehicles, boats, etc., and more particularly to a modular top for such vehicles.

BACKGROUND

The statements in this section merely provide background information related to the present disclosure and may not constitute prior art.

Open cabin vehicles such as golf cars, personal transportation vehicles, boats, etc., often include a protective top mounted over the passenger cabin or seating area by top support struts. Such protective tops generally provide protection to passengers of the vehicle from such things as sun and rain.

Typically, such tops comprise a hard plastic, fiberglass, resin or composite roof panel mounted over the passenger cabin or seating area by the top support struts. Additionally, in various implementations such roof panels include a metal strip or band covering a peripheral edge of the roof panel to aesthetically finish the peripheral edge, and in various instances, to provide mounting points for mounting the panel to the uprights, and/or provide one or more fastening means for fastening a vehicle accessory, such as side curtains or side panels, to the roof panel. In order to provide protection to passengers of the vehicle, such roof panels typically have a footprint large enough to cover a substantial part of the vehicle, for example, a footprint that is larger than the passenger cabin, e.g., 5'×4'×1'.

Accordingly, to ship such roof panels a shipping package/box large enough to enclose the roof panel is required. Such large packages/boxes are difficult to ship reliably and without damage to the roof panel, e.g., bending, breaking, cracking or crushing the roof panel, thereby creating a situation where a second roof panel must be shipped. Such duplicative shipping creates additional cost to the manufacture and time delays to the recipient. Furthermore, such roof panels are often fabricated by thermoforming plastic, fiberglass, resin or a composite. Because the process of thermoforming is a low temperature heating and shaping process, the resultant panels and known to occasionally deform from exposure to the heat of the sun, thereby requiring replacement.

SUMMARY

The present disclosure generally provides a modular top system for a vehicle, and a vehicle including such a modular top system, wherein the modular top system includes a plurality of rail sections, a plurality of corner brackets structured and operable to connect the rail sections to form a frame, and a flexible, collapsible cover structured and operable to be deployed over and connected to the frame. In various embodiments, the modular top system additionally includes a plurality of cover connecting devices, wherein at least one of the connecting devices is disposable on a periphery of each of a plurality of sides of the cover. Each connecting device is structured and operable to removably connect each respective cover side to the frame to deploy the cover over and connect the cover to the frame. In various embodiments, each rail section comprises at least one assembly connector structured and operable to connect any of a plurality of system assembly components to the respective rail section, and/or at least one accessory connector structured and operable to connect at least one modular top accessory to the respective rail section. Furthermore, in various embodiments the modular top system includes at least one truss connectable to the frame and structured and operable to support one or more sections of the cover when the cover is connected to the frame. For example the modular top system can include a single truss disposed along a longitudinal or lateral center line of the cover, two trusses equally spaced from a longitudinal or lateral center line of the cover, three trusses can be longitudinally or laterally spaced across the width or length of the cover, etc.

In various other embodiments, each rail section comprises a cover deployment channel and the flexible cover comprises a plurality of deployment slats, wherein each deployment slat is fixedly connected to the cover along a periphery of a respective one of a plurality of the sides of the cover. Moreover, each deployment slat is structured and operable to be disposed within the cover deployment channel of a respective one of the rail sections to securely connect the cover to the frame. Additionally, in various embodiments, each rail section comprises an internal lumen structured and operable to receive one of a pair of legs of at least one of corner brackets to thereby connect two rail sections together to form the frame. In various embodiments, each rail section further comprises at least one nut retention channel provided on at least a portion of a side of the respective rail section. Each nut retention channel is structured and operable to receive and retain at least one threaded nut and prevent each threaded nut from turning such that a threaded bolt can be threadingly engaged with the respective nut to affix at least one system assembly component to the respective rail section. Still further, in various embodiments each rail section further comprises at least one accessory attachment channel provided on at least a portion of a side of the respective rail section. Each accessory attachment channel is structured and operable to receive and retain at least one fastener of a respective modular top accessory to connect the accessory to the respective rail section.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

The embodiments disclosed below are not intended to be exhaustive or to limit the invention to the precise forms disclosed in the following detailed description. Rather, the embodiments are chosen and described so that others skilled in the art can utilize their teachings.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

Although the terms first, second, third, etc. can be used herein to describe various elements, components, regions, devices, objects, sections, etc., these elements, components, regions, devices, objects, sections, etc., should not be limited by these terms. These terms may be used only to distinguish one element, component, region, device, object, section, etc., from another region, device, object, section etc., and do not necessarily imply a sequence or order unless clearly indicated by the context.

Figure 1:
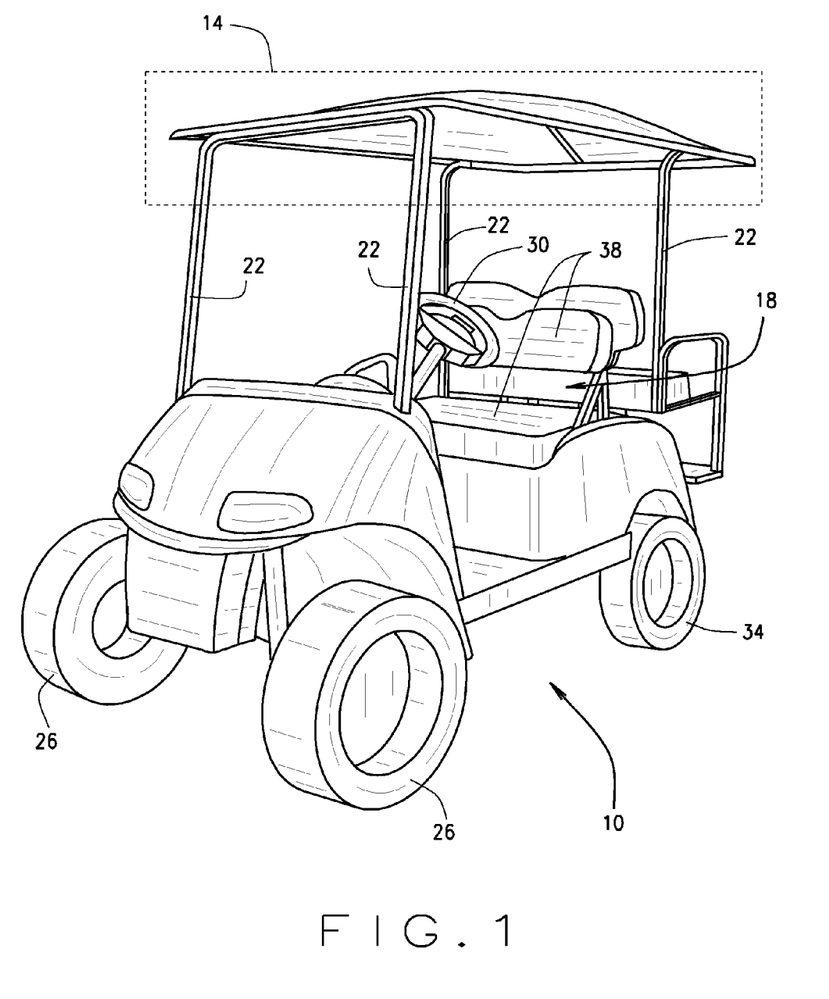
FIG. 1 is an isometric view of a vehicle including a modular top system, in accordance with various embodiments of the present disclosure.

Referring to FIG. 1, the present disclosure provides an open cabin vehicle 10, such as a golf car, a utility vehicle, a maintenance vehicle, a cargo vehicle, a shuttle vehicle, a personal transportation vehicle, a boat, etc., that includes a flexible and collapsible modular top system 14 that can be deployed over at least a passenger cabin or area 18 of the vehicle 10. As described further below, the top system 14 can be mounted to the vehicle 10 via top support struts 22. Generally, the vehicle 10 additionally includes a pair of front wheels 26 operably connected to a steering wheel 30 for steering the vehicle 10, and a pair of rear wheels 34, at least one of which is operably connected to a prime mover (e.g., an internal combustion engine or electric motor) (not shown) and drivetrain (not shown) for providing motive force to the vehicle 10. Additionally, the vehicle 10 generally includes at least one seat 38 within the passenger cabin 18 for accommodating a driver and/or one or more passengers, e.g., a single bench seat, a pair of side-by-side seats, two rows of bench or side-by-side seats, etc.

Figure 2:
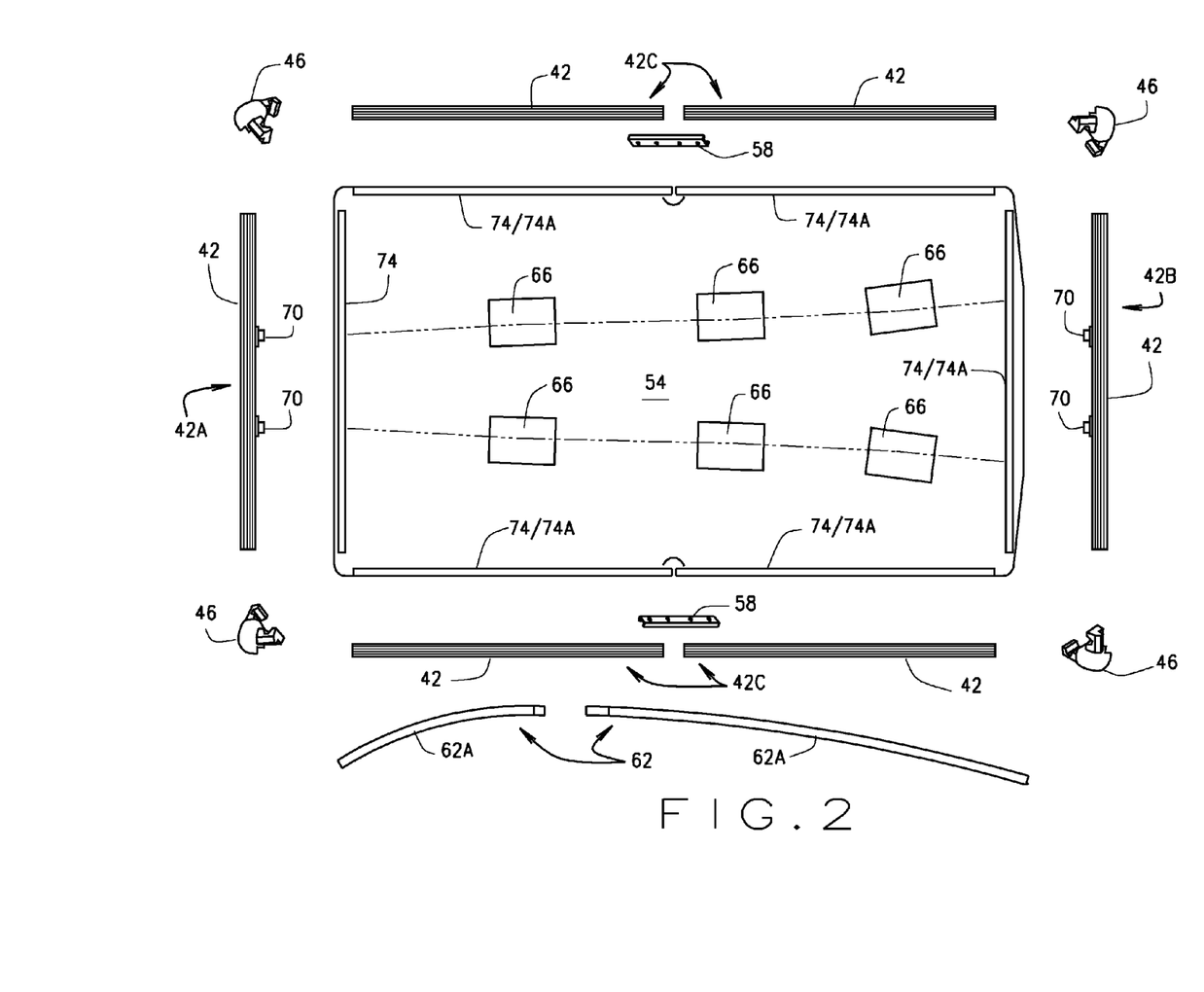
FIG. 2 is an exploded view of the modular top system shown in FIG. 1, in accordance with various embodiments of the present disclosure.
Figure 3:
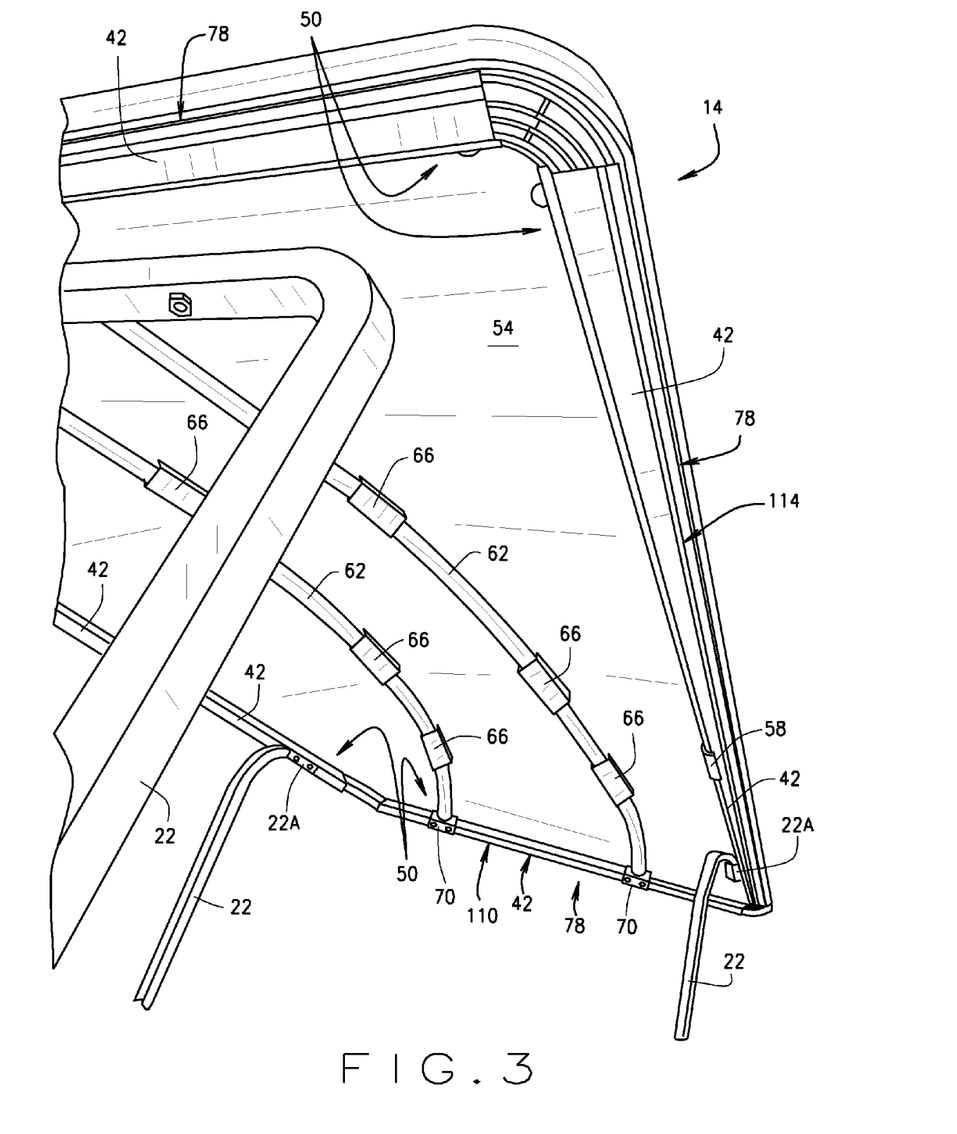
FIG. 3 is an isometric view of the modular top system shown in FIG. 1 attached to top support struts of the vehicle shown in FIG. 1, in accordance with various embodiments of the present disclosure.

Referring now to FIGS. 1, 2 and 3, the modular top system 14 includes a plurality of rail sections 42, a plurality of corner brackets 46 structured and operable to connect the rail sections 42 to form a frame 50, and a flexible, collapsible cover 54 that structured and operable to be deployed over and connected to the frame 50, as described below. The rail sections 42 can be fabricated of any material using any fabrication process that will provide the rail sections 42 with the structural integrity, strength, rigidity and durability sufficient to: 1) allow the cover 54 to be disposed over and connected to the rail sections 42 with a desired tautness without collapsing or bending the rail sections 42; and 2) support the assembled modular top system 14 above the vehicle 10, via the uprights 22, with the structural integrity, strength and durability that is substantially equal to that of known thermoformed vehicle tops. For example, in various embodiments, the rail sections 42 can be fabricated of extruded aluminum. Alternatively, the rail sections can be milled, molded, forged, etc., from aluminum, any other metal, plastic, fiberglass, composite, polycarbonate or any other desirable and suitable material. Furthermore, the rail sections 42 can be fabricated to have any desired length, e.g., 1 foot, 2 feet, 3 feet, 4 feet, 6 feet, 10 feet, etc., and can also be cut to have any desired length. Hence, the rail sections 42 can be connected, as described herein, to construct the frame 50 having any desired dimensions.

Additionally, the rail sections 42 can be straight or curved and connected to form the frame 50 having any desired shape, e.g., square, rectangular, triangular, round, oval, etc. For exemplary purposes, the frame 50, and hence the modular top system 14, will be illustrated throughout the various figures as having a rectangular shape having a front rail identified as 42A, a rear rail identified as 42B and opposing side rails identified as 42C. In the example embodiments illustrated, the front and rear rails 42A and 42B comprise a single rail section 42 and the opposing side rails 42C comprise a plurality of rail sections 42 connected together via a connecting clip 58. However, it is envisioned that any of the front, rear and/or side rails 42A, 42B and/or 42C can comprise a single or multiple rail sections 42 to provide the frame 50 having any desired dimensions and shape. Importantly, the rail sections 42 can be fabricated to have any desired length such that packaging for shipping of the disassembled modular top system 14 can be compact and have a footprint that is of a desired convenient size and shape and is much smaller than the footprint of the resulting assembled modular top system 14. The connecting clips 58 can be any device, structure or mechanism suitable for fixedly joining and connecting adjacent rail sections 42 such as a perforated metal strap, brace or bracket that can be bolted, riveted, screwed, etc. to adjacent end portion of the respective rail sections 42. The connecting clips 58 can be formed to have a shape and size compatible with the size and cross-sectional shape of the respective rail sections 42.

In various embodiments, the modular top system 14 further comprises one or more cover trusses 62 that are structured and operable to support one or more portions of the cover 54 when the cover 54 is connected to the frame 50. For example the modular top system can include a single truss disposed along a longitudinal or lateral center line of the cover, two trusses equally spaced from a longitudinal or lateral center line of the cover, three trusses longitudinally or laterally spaced across the width or length of the cover, etc. Particularly, each truss 62 extends between and is connectable at opposing ends to the front and rear rails 42A and 42B, and/or between and to the opposing side rails 42C to provide support for the cover 54 such that the cover 54 will not sag once it is disposed over and connected to the frame 50. In various embodiments, each truss 62 can comprise one or more sections 62A that are connectable, via any suitable connections method or means, to provide the respective truss 62. Additionally, in various embodiments, each truss can have a bowed or arched shape to substantially provide a buttress for supporting the cover 54 and any additional weight that may be added to the cover, e.g., water/rain, snow, etc., as illustrated in FIG. 3.

Furthermore, in various embodiments, the cover 54 can include one or more truss sleeves 66 that are structured and operable to retain each truss 62 in a desired location of the cover 54. In various implementations, each truss sleeve 66 comprises a swathe, stripe or strap of cloth or canvas or other flexible material that is attached to the cover 54 along a center of the sleeve 66 and is detachably connectable at opposing ends or sides, via any suitable connecting means, e.g., hook and loop connectors, snaps, buttons, etc. Accordingly, the sleeve 66 can be wrapped around the respective truss 62 to hold a portion of the respective truss 62 at a certain location of the cover 54. Alternatively, the one or more truss sleeves 66 can comprises one or more closed loop sleeves of any desired length attached to the cover 54, whereby the respective truss 62 can be inserted in and extended through the respective closed loop sleeve(s).

The opposing ends of each truss 62 are connectable to the front and rear rails 42A and 42B, and/or to the opposing side rails 42C using any suitable connection method or means. For example, in various embodiments, the opposing ends of each truss 62 are connectable to the front and rear rails 42A and 42B, and/or to the opposing side rails 42C using truss brackets 70 that are mountable, e.g., via bolts or screws, to the front and rear rails 42A and 42B, and/or to the opposing side rails 42C and comprise a pocket, reservoir, cup, pin, etc., that is structured and operable to receive or be received by the ends of the respective truss 62.

As described above, the rail sections 42 can be fabricated to have any desired length such that packaging for shipping of the disassembled modular top system 14 can be compact and have a footprint that is of a desired convenient size and shape and is much smaller than the footprint of the resulting assembled modular top system 14. Similarly, the cover 54 can be fabricated of any desirable flexible and collapsible material such as canvas, vinyl, plastic, cloth, etc., that will allow the cover 54 to be rolled and/or folded to a size such that packaging for shipping of the disassembled modular top system 14 can be compact and have a footprint that is of a desired convenient size and shape and is much smaller than the footprint of the resulting assembled modular top system 14. Accordingly, when assembling the modular top system 14 the cover 54 can be unrolled and/or unfolded and disposed over and connected to the assembled frame 50, as described herein. Additionally, the cover 54 is fabricated to have a size and shape substantially equal to or slightly larger than the size and shape of the outer perimeter of assembled frame 50. Therefore, once the frame 50 is assembled, the cover 54 can be disposed over the frame 50 and connected to the frame 50 along a peripheral edge of the cover 54 using any suitable connecting device.

For example, in the various embodiments wherein the frame 50 and cover 54 have a rectangular shape, the modular top system 14 can comprise a plurality of cover connecting devices 74, wherein at least one cover connecting device 74 is connected to, or disposable on, a periphery of a respective one of a plurality of edges of the cover 54, wherein each connecting device 74 is structured and operable to removably connect each respective cover edge to the frame 50 to deploy the cover 54 over and connect the cover 54 to the frame 50. More specifically, the cover 54 comprises the plurality of cover connecting devices 74 and each rail section 42 includes a at least one connecting device complimentary structure, generally indicated at 78 in FIG. 3, that is structured and operable to mate with or connect to a respective one of the cover connecting devices 74, to thereby connect the cover 54 to the frame 50.

The cover connecting devices 74 and complimentary structures 78 can define, provide or comprise any device or mechanism suitable to removably connecting each respective cover edge to the frame 50. For example, in various embodiments each cover connecting device 74 can be button holes and the complimentary structures 78 can be buttons or grommets that mate with the button holes, or each cover connecting device 74 can be a first half of snap and the complimentary structures 78 can be the second half of the respective snaps, or each cover connecting device 74 can be a hook and the complimentary structures 78 can be loops or holes to which the hooks can mate, or each cover connecting device 74 can be the first half of a hook and loop connecting strips (e.g. Velcro® strips) and structures 78 can be the respective second half of such connecting strips.

Figure 4:
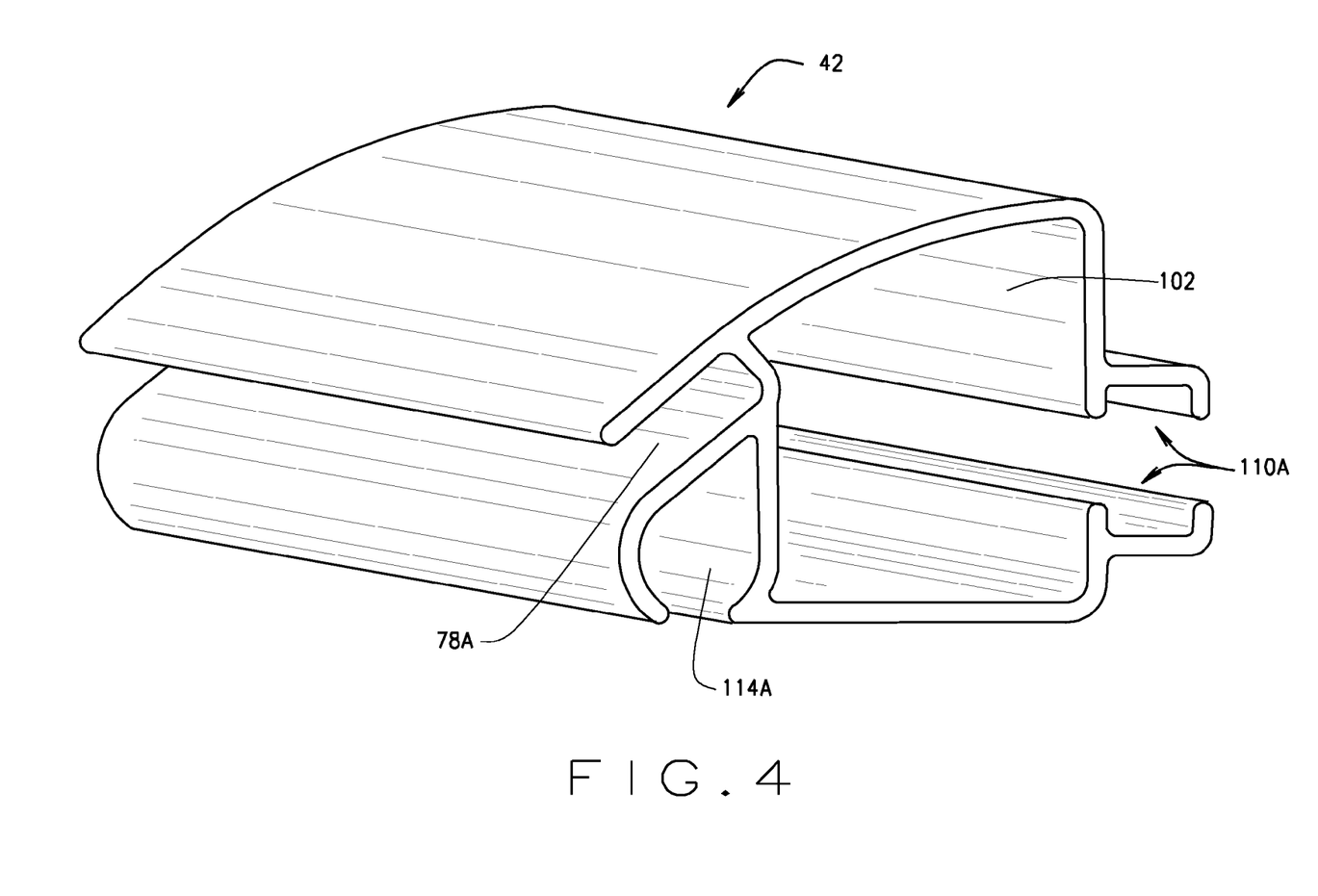
FIG. 4 is an isometric cross-section of a portion of a rail section of the modular top system shown in FIG. 1, in accordance with various embodiments of the present disclosure.
Figure 5:
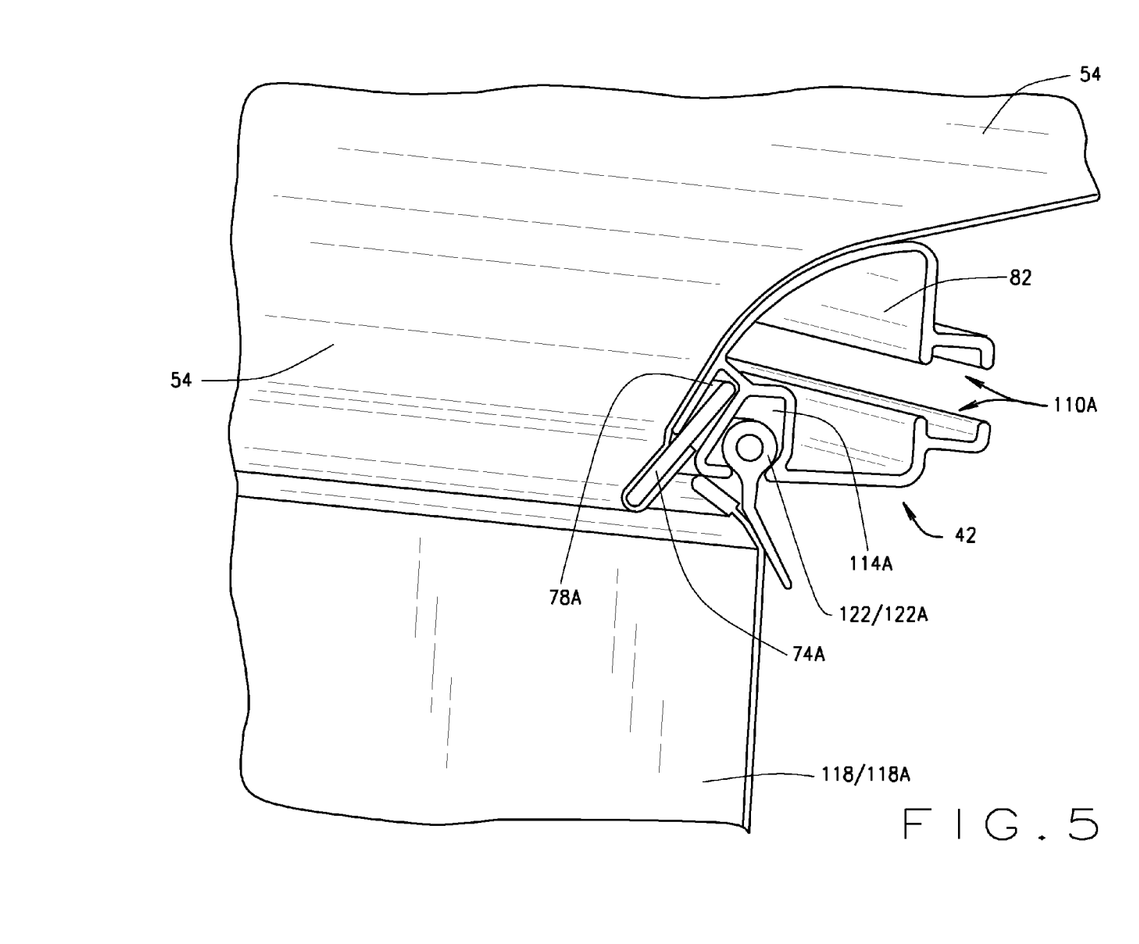
FIG. 5 is an isometric cross-section of a portion of the rail section of the modular top system shown in FIG. 1 having a flexible, collapsible cover and a modular top accessory connected thereto, in accordance with various embodiments of the present disclosure.
Figure 6:
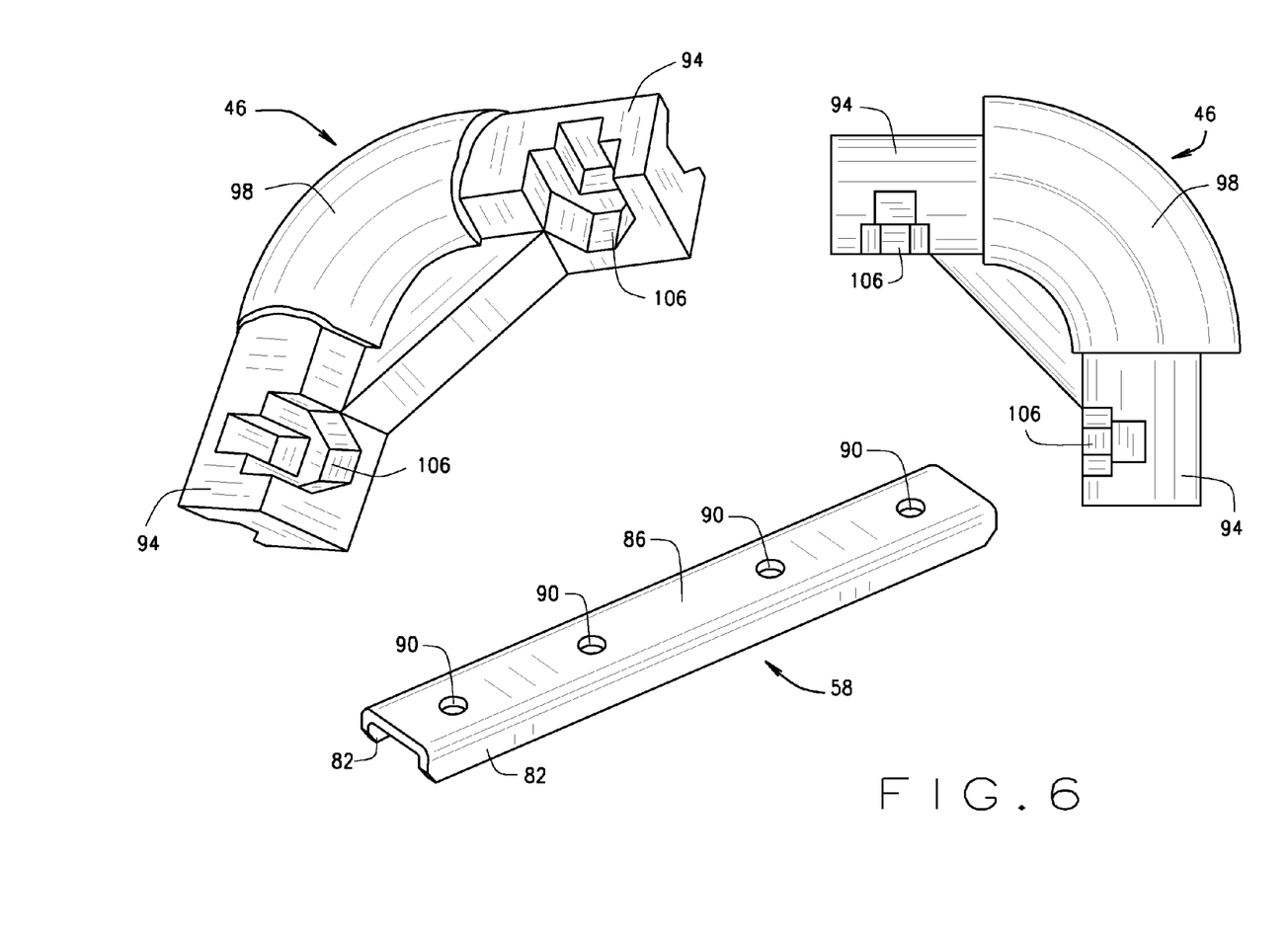
FIG. 6 is an isometric view and a top view of a corner bracket and an isometric view of a connecting clip of the modular top system shown in FIG. 1, in accordance with various embodiments of the present disclosure.

Referring now to FIGS. 1, 2, 3, 4, 5 and 6, as described above, the rail sections 42 can be connected by the corner brackets 46 and the connecting clips 58 (when needed) to assemble or form the frame 50. Particularly, the corner brackets 46 provide the corners of the frame 50 and the connecting clips 58 join two adjacent rail sections 42 together to provide any one or more of the front, rear and/or side rails 42A, 42B and/or 42C. The connecting clips 58 can be any connecting device suitable for joining adjacent rail sections 42 to form the respective front, rear and/or side rails 42A, 42B and/or 42C. For example, as illustrated in FIG. 6, in various embodiments the connecting clips 58 can be perforated metal C-channels having a pair of longitudinal arms 82 extending from a bridge plate 86 that includes a plurality of through holes 90. The corner brackets 46 can be any bracket suitable for joining two rail sections 42 to form a corner, and can be structured to form a having any desired angle, e.g., a 30° corner, a 45° corner, a 60° corner, a 90° corner, etc. For example, as illustrated in FIG. 6, in various embodiments the corner brackets 46 can be molded plastic or metal brackets comprising a pair of opposing legs 94 that extend from a curved center body 98.

Additionally, as described above, in various embodiments, the rail sections 42 can be fabricated of extruded aluminum to provide the structural integrity, strength, rigidity and durability sufficient to: 1) allow the cover 54 to be disposed over and connected to the rail sections 42 with a desired tautness without collapsing or bending the rail sections 42; and 2) support the assembled modular top system 14 above the vehicle 10, via the uprights 22, with the structural integrity, strength and durability that is substantially equal to that of known thermoformed vehicle tops. In various implementations of such embodiments, each rail section 42 can comprise an internal lumen 102 structured and operable to receive a respective one of the legs 94 of at least one of corner brackets 46 to thereby connect two rail sections 42 together to form the frame 50. In various implementations, each leg 94 of each corner bracket 46 can include a nut reservoir 106 structured and operable to receive and retain a threaded nut that can be threadingly mated with a threaded bolt to secure each respective corner bracket 46 to the respective rail sections 42.

Accordingly, to assemble the frame 50, any rail 42A, 42B or 42C comprising more than one rail section 42 is assembled by connecting the ends of the respective rail sections 42 together using the connecting clips 58. For example, bolts can be inserted through two or more of the through holes 90 and threaded into nuts retained by or connected to the respective rail sections 42, thereby connecting the rail sections 42. It is envisioned, that in various embodiments, a joint plug (not shown) having opposing ends sized and shaped to tightly fit within the internal lumens 102 of the respective rail sections 42 can be inserted into the internal lumens 102 at the adjacent ends of the rail sections 42 being connected to provide additional structural integrity, strength and rigidity to the assembled rail. Subsequently, the front, rear and side rails 42A, 42B and 42C (each comprising one or more rails sections 42) can be connected, via the corner brackets 46, to form the frame 50. Particularly, the legs 94 of each corner bracket 46 can be inserted into the internal lumen 102 of the respective rails sections 42 and secured in place via bolts threaded into nuts retained within the respective nut reservoirs 106 of each corner bracket leg 94.

As described above, the modular top system includes a plurality of cover connecting devices 74 and each rail section 42 includes at least one connecting device complimentary structure 78, wherein the connecting devices 74 and complimentary structures 78 are structured and operable to removably mate to removably connect the edges of the cover 54 to the frame 50 to deploy the cover 54 over and connect the cover 54 to the frame 50. In various embodiments, best shown in FIGS. 4 and 5, the complimentary structures 78 comprise cover deployment channels 78A formed in an outer side of each rail section 42 and the connecting devices comprise one or more deployment slats 74A connected to the cover 54 (e.g., sewn, stapled, glued and/or riveted to the cover 54) along the peripheral edges thereof. The outer side is defined herein as the side of each rail section 42 that forms the peripheral edge or side of the assembled frame 50. Conversely, an inner side of each rail section 42 will be defined herein as the side of each rail section that forms the inner edge or side of the assembled frame 50.

In such embodiments, the deployment slats 74A comprise a slat or strip of material, e.g., plastic, aluminum, etc., that is rigid and substantially not flexible in a lateral direction (e.g., across the width of the slats) and stiff but having some flexibility in a longitudinal direction (e.g., along the length of the slats). Additionally, each deployment slat 74A is connected to a respective peripheral edge of the cover along only a portion of the slat 74A, e.g., alone a lateral half of the slat 74A, such that the remaining portion of the slat 74A, e.g., the remaining lateral portion of the slat 74 can be inserted into and retained within the deployment channel(s) 78A of the respective rail section(s) 42, as illustrated in FIG. 5. Accordingly, to deploy the cover 54 over and connect the cover 54 to the frame 50 a first side edge and one of the front or rear edges of the cover 54 are connected to a first side rail 42C and one of the front or rear rails 42A or 42B by inserting the deployment slats 74A attached to the corresponding edges of the cover 54 into the deployment channels 78A of the respective rails. Subsequently, the opposing side edge and front or rear edge of the cover 54 are connected to the opposing side rail 42C and the opposing front or rear rail 42A or 42B by pulling the cover taut across the frame 50 and inserting the deployment slates 74a attached to the corresponding edges of the cover 54 into the deployment channels 78A of the respective rails.

Importantly, the cover 54 is sized and shaped to have substantially the same size (or slightly larger) and shape as that defined by the outer edge or periphery of the assembled frame 50. Therefore, the cover 54 must be pulled taut across the assembled frame 50 to be able to insert the all of the deployment slats 74A into the respective deployment channels 78A. Moreover, the tautness and the synergetic inward forces (e.g., toward a center portion of the cover 54) created by pulling the cover 54 taut over the frame 50 will keep the deployment slats 74A bound or pinched, and retained within deployment channels 78A such that the cover 54 will not unintentionally separate from the frame 50. In various embodiments, the cover 54 can include pull tabs or loops (not shown) that are connected at or near one or more of the cover edges, wherein the tabs or loops can be used to pull the cover 54 taut across the frame 50 and assist in inserting the deployment slats 74A into the deployment channels 78A.

Additionally, in those embodiments wherein the modular top system 14 includes one or more trusses 62, upon installation and positioning of the truss(es) 62 to provide support for the cover 54, the truss(es) 62 will provide additional synergetic inward forces that pull the cover 54 taut over the frame 50 to keep the deployment slats 74A bound or pinched, and retained within deployment channels 78A. The truss(es) 62 can be installed and positioned before or after the cover 54 is deployed over and connected to the frame 50. For example, in various implementations, the truss(es) 62 can be connected to opposing rails 42A and 42B, and/or opposing side rails 42C and 42C, but left in a prone or 'laid down' position, e.g., not positioned such that the bowed truss(es) 62 are in an upright buttress support position shown in FIG. 3. Thereafter, the cover 54 can be deployed over and connected to the frame 50 as described above. Then, once the cover 54 is deployed and connected to the frame 50, the truss(es) 62 can be rotated into the upright buttress support position shown in FIG. 3, whereby the truss(es) 62 create additional synergetic inward forces that pull the cover 54 taut over the frame 50 and keep the deployment slats 74A bound or pinched, and securely retained within deployment channels 78A.

Referring particularly to FIGS. 3, 4 and 5, in various embodiments, at least one or each rail section 42 can comprise at least one assembly connector, generally indicated at 110 in FIG. 3, that is/are structured and operable to connect any of a plurality of system assembly components, e.g., the truss brackets 70, brackets 22A for connecting the assembled modular top system 14 to the vehicle top support struts 22, etc., to the respective rail section 42. The assembly connectors 110 can be any device, assembly, mechanism, attachment, or component that is suitable for connecting various assembly components, e.g., the truss(es) 62, the top support struts 22, etc., to the respective rail section 42. For example, the assembly connectors 110 can be threaded nuts welded, glued or otherwise affixed to the respecting rail sections 42 for threadingly engaging with corresponding bolts to connect an assembly component to the respective rail section 42, and/or threaded holes disposed at various locations along the respective rail sections 42 for threadingly engaging with corresponding bolts to connect an assembly component to the respective rail section 42, and/or holes disposed at various locations along the respective rail for receiving expandable push-in plugs or rivets to connect an assembly component to the respective rail section 42, etc.

Particularly, in various embodiments, the assembly connectors 110 can comprise at least one nut retention channel 110A provided on at least a portion of the inner side of the respective rail section 42. Each nut retention channel 110A is structured and operable to receive and retain at least one threaded nut and prevent each threaded nut from turning. Therefore, a threaded bolt can be threadingly engaged with the respective nut to affix at least one system assembly component, e.g., the truss brackets 70, the top support strut brackets 22A, etc., to the respective rail section 42. As an example, the nut retention channels 110A are illustrated as being longitudinally disposed or formed along the length of the inner side of the respective rail sections 42. However, it is envisioned that each rail section 42 can include a plurality of short nut retention channels 110A laterally disposed at various locations along the inner side of the respective rail sections 42.

Furthermore, in various embodiments, at least one or each rail section 42 can comprise at least one accessory connector, generally indicated at 114 in FIG. 3, that is/are structured and operable to connect at least one vehicle and/or modular top system accessory 118, e.g., a vehicle side curtain, side panels, a windshield, a light fixture, a speaker, a tool holder, etc., to the respective rail section 42. The accessory connectors 114 can be any device, assembly, mechanism, attachment, or component that is suitable for connecting various vehicle and/or modular top system 14 accessories 118 to the respective rail section 42. For example, the assembly connectors 110 can be threaded nuts welded, glued or otherwise affixed to the respecting rail sections 42 for threadingly engaging with corresponding bolts to connect an accessory 118 to the respective rail section 42, and/or threaded holes disposed at various locations along the respective rail sections 42 for threadingly engaging with corresponding bolts to connect an accessory 118 to the respective rail section 42, and/or holes disposed at various locations along the respective rail for receiving expandable push-in plugs or rivets to connect an accessory 118 to the respective rail section 42, etc.

Particularly, in various embodiments, the accessory connectors 114 can comprise at least one accessory attachment channel 114A provided on at least a portion of the outer side of the respective rail section 42. Each accessory attachment channel 114A is structured and operable to receive and retain at least one fastener 122 of the respective modular top accessory 118 to connect the accessory 118 to the respective rail section 42. For example, as shown in FIG. 5, in various implementations the accessory 118 can be a vehicle side curtain 118A having a tubular or cylindrical fastener 122A attached along a top edge of the curtain 118A. Accordingly, the tubular or cylindrical fastener 122A can be squeezed or collapsed or otherwise inserted into the accessory attachment channel 114A, whereafter the tubular or cylindrical fastener 122A expands or is otherwise retained within the channel 114A. As an example, the accessory attachment channels 114A are illustrated as being longitudinally disposed or formed along the length of the outer side of the respective rail sections 42. However, it is envisioned that each rail section 42 can include a plurality of short accessory attachments channels 114A laterally disposed at various locations along the outer side of the respective rail sections 42.

Although the rail sections 42 have been described above as being fabricated to have a specific length whereby the rail sections 42 can connected together and/or cut to any desired length to form the front, rear and side rails 42A, 42B and 42C having any desired length, it is envisioned that in various embodiments, one or more of the rail sections 42 can be fabricated to be a telescoping rail section such that the respective rail section 42 can be expanded and collapsed to form the front, rear and/or side rails 42A, 42B and/or 42C having any desired length.

Additionally, although the cover 54 has been described above as being sized and shaped to be disposed over and connected to an outer periphery of the frame 50, it is envisioned that in various embodiments the cover can be fabricated to have a size and shape substantially equal to or slightly larger than an inner perimeter of the frame 50, wherein the cover 50 can be connected to the frame 50 along the inner sides of the front, rear and side rails 42A, 42B and 42C. Accordingly, in such embodiment, when assembling the modular top system 14 the cover 54 can be unrolled and/or unfolded and disposed within and connected to the inner perimeter of the assembled frame 50. It is further envisioned that in various embodiments, the cover 50 can be fabricated to have a size and shape such that the cover 50 can be disposed within and connected to the inner sides of one or more of the front, rear and/or side rails 42A, 42B and/or 42C, and also disposed over and connected to the outer sides of one or more of the front, rear and/or side rails 42A, 42B and/or 42C.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A modular top system for a vehicle, said top system comprising:
    a plurality of rail sections;
    a plurality of corner brackets structured and operable to connect the rail sections together to form a plurality of corners between the connected rail sections, thereby forming a frame; and
    a flexible, collapsible cover structured and operable to be:
        deployed at least one of within at least a portion of the frame and over at least a portion of the frame, and
        connected to the frame.

2. The system of claim 1 further comprising at least one truss connectable to the frame and structured and operable to support the cover when the cover is connected to the frame.

3. The system of claim 1 further comprising a plurality of cover connecting devices, wherein at least one connecting device is disposable on a periphery of a respective one of a plurality of edges of the cover, each connecting device structured and operable to removably connect each respective cover edge to the frame to connect the cover to the frame.

4. The system of claim 3, wherein at least one rail section comprises at least one assembly connector structured and operable to connect a system assembly components to the respective rail section.

5. The system of claim 4, wherein at least one rail section comprises at least one accessory connector structured and operable to connect at least one modular top accessory to the respective rail section.

6. The system of claim 5, wherein each rail section further comprises an internal lumen structured and operable to receive one of a pair of legs of at least one of the corner brackets to thereby connect two rail sections together to form the frame.

7. A modular top system for a vehicle, said top system comprising:
    a plurality of rail sections;
    a plurality of corner brackets structured and operable to connect the rail sections together to form a plurality of corners between the connected rail sections, thereby forming a frame; and
    a flexible, collapsible cover structured and operable to be:
        deployed at least one of within at least a portion of the frame and over at least a portion of the frame, and
        connected to the frame; and
    at least one truss connectable to the frame and structured and operable to support the cover when the cover is connected to the frame.

8. The system of claim 7, wherein each rail section further comprises an internal lumen structured and operable to receive one of a pair of legs of at least one of the corner brackets to thereby connect two rail sections together to form the frame.

9. The system of claim 8 further comprising a plurality of cover connecting devices, wherein at least one connecting device is disposable on a periphery of a respective one of a plurality of edges of the cover, each connecting device structured and operable to removably connect each respective cover edge to the frame to connect the cover to the frame.

10. The system of claim 9, wherein at least one rail section comprises at least one assembly connector structured and operable to connect a system assembly components to the respective rail section.

11. The system of claim 10, wherein at least one rail section comprises at least one accessory connector structured and operable to connect at least one modular top accessory to the respective rail section.

12. A vehicle, said vehicle comprising:
    a modular top system comprising:
        a plurality of rail sections;
        a plurality of corner brackets structured and operable to connect the rail sections together to form a plurality of corners between the connected rail sections, thereby forming a frame;
        a flexible, collapsible cover structured and operable to be:
            deployed at least one of within at least a portion of the frame and over at least a portion of the frame, and
            connected to the frame; and
        a plurality of cover connecting devices, wherein at least one connecting device is disposable on a periphery of a respective one of a plurality of edges of the cover, each connecting device structured and operable to removably connect each respective cover edge to the frame to connect the cover to the frame; and
    a plurality of top support struts, each top support strut connectable to a respective rail section for mounting the modular top system to the vehicle.

13. The system of claim 12, wherein at least one rail section comprises at least one assembly connector structured and operable to connect a system assembly component to the respective rail section.

14. The system of claim 13, wherein at least one rail section further comprises at least one accessory connector structured and operable to connect at least one modular top accessory to the respective rail section.

15. The system of claim 14 further comprising at least one truss connectable to the frame and structured and operable to support the cover when the cover is connected to the frame.

\* \* \* \* \*